United States Patent [19]

Wright

[11] Patent Number: 5,003,699
[45] Date of Patent: Apr. 2, 1991

[54] LEVEL VIAL WITH EXTENDER PITCH RANGE

[76] Inventor: Randall J. Wright, 3535 Studio Ct., Brookfield, Wis. 53005

[21] Appl. No.: 399,850

[22] Filed: Jul. 19, 1982

[51] Int. Cl.$^5$ .............................................. G01C 9/24
[52] U.S. Cl. ........................................ 33/379; 33/389
[58] Field of Search ................... 33/379, 386, 389, 377

[56] References Cited

U.S. PATENT DOCUMENTS

| | | | |
|---|---|---|---|
| 771,803 | 10/1904 | Bishop | 33/379 |
| 1,654,248 | 12/1927 | Erdmann | 33/379 |
| 3,383,772 | 5/1968 | Gardner et al. | 33/379 |
| 3,842,514 | 10/1974 | Scheyer | 33/379 |
| 3,871,109 | 3/1975 | Vaida | 33/379 |
| 4,347,088 | 8/1982 | Jacquet | 33/379 X |

*Primary Examiner*—Willis Little
*Attorney, Agent, or Firm*—Jones, Day, Reavis & Pogue

[57] ABSTRACT

A level vial for use in connection with a level instrument for determining angular relationships wherein the geometry of the internal vial components and, in particular, the bore and core surfaces co-act with the bubble to produce a level vial having an increased radius of curvature while maintaining standard sensitivity and having the capability of providing a visual measure of a relatively wide range of angular deflections from horizontal.

13 Claims, 1 Drawing Sheet

LEVEL VIAL WITH EXTENDER PITCH RANGE

This invention relates generally to vials for level measuring instruments and, particularly, to a vial of standard sensitivity having extended measuring capability for near-level angular deflections known in the building trades as pitch angles.

Vial sensitivity is defined as the ratio of lateral or linear bubble movement for a corresponding vial deflection or pitch change. The greater the bubble movement for a given angular deflection or unit of pitch change the greater the sensitivity of the vial.

Industry requirements and federal standards have, in large measure, substantially limited manufacturing flexibility by the adoption for most applications of a nominal sensitivity standard of 1/10 inch bubble travel for a pitch change of ⅛ inch per foot. The development of level instruments has been restricted by these standards which have limited utilization of varying sensitivities for general applications.

Modern conventional vials, such as shown in D. E. Wright, U.S. Pat. No. 3,311,990, have long utilized a barrel-shaped bore as the means for determining a level condition. When level, the air pocket or bubble of such an instrument will come to rest at the highest point within the bore. The sensitivity of the conventional vial is determined by the radius of curvature of its bore measured by the arc of the bore contained within a plane defined by its axis. By increasing the radius of curvature and correspondingly flattening the barrel shape of the bore of such a vial, the sensitivity of the level will be increased. Similarly, decreasing the radius of curvature and exaggerating the barrel shape of the vial in longitudinal cross-section will serve to correspondingly reduce the vial sensitivity. It follows, then, that for any particular vial sensitivity, a unique radius of curvature exists which will produce that sensitivity. A nine inch radius of curvature is the standard for conventional vials which meet the federal and industry sensitivity requirement.

Conventional level vials exhibit a limited ability to provide a broad range of visual measure of angular deflections from level or horizontal. This deficiency is best observed when the conventional vial is deflected very gradually from a level or horizontal plane. Initially, when level, the bubble will be observed to be squarely centered between the vial ends. A slight deflection of the vial from the level or horizontal position will produce bubble movement or travel along the vial axis, e.g. 1/10 inch of bubble travel for a change in pitch of ⅛ inch per foot (FIG. 4) in a vial having a nine inch radius of curvature. As this deflection or pitch is increased gradually, the bubble is displaced proportionally from its centered level position until the bubble rather abruptly moves to one of the vial ends (FIG. 6). At the point of abrupt movement or acceleration of the bubble, the vial loses its ability to serve as a measuring instrument.

This abrupt acceleration or bubble movement along the vial axis is caused by the bubble "slipping out" of the curved barrel section of the vial into an adjacent cylindrical bore region where its momentum will carry it to the corresponding vial end without further angular increases of the vial. This "slipping out" tendency of conventional vials is produced by the relatively short barrel-shaped bore section utilized in conventional vials of the type generally illustrated in U.S. Pat. No. 3,311,990 wherein the bore section is formed only slightly longer than the bubble itself. Consequently, the bubble reaches the end of the barrel region, and its measuring capability at relatively low pitch angles is lost.

The axially short barrel regions of conventional vials are mandated by manufacturing requirements which call for the maintenance of a maximum 'negative draft' in the barrel region to keep the internal vial geometry within manageable and controllable manufacturing limits. Specifically, increasing the subtended bore angle correspondingly increases the negative draft of the core piece utilized to mold the vial bodies. For negative drafts of approximately 0.007 inch or less, the core in an injection molding process for producing vials can simply and inexpensively be axially retracted without damaging the vial body. Since this technique cannot be employed for significantly higher drafts, the pitch measurement range of levels employing conventional vials is thereby effectively limited.

In various trades, for example masonry and plumbing, precise leveling is not always required. In these situations an indication of approximate or "close to level" is entirely sufficient. Due to the narrow pitch range of these conventional levels the user often obtains only a non-level indication even though the surface being measured is sufficiently level. In short, conventional levels of standard sensitivity provide adequate indications only when the surface is substantially level and provide virtually no relative indication of level where the surface is close but not substantially level. This is viewed by many craftsmen as a serious shortcoming of conventional level instruments.

The level vial of this invention overcomes this limitation and provides a significantly increased range of pitch measurement while simultaneously retaining current sensitivity standards. This is accomplished by increasing the radius of curvature of the vial bore and substantially lengthening the barrel bore section while maintaining negative draft of the barrel region within controllable manufacturing limits. A pin core member is provided to coact with the predetermined bore surface curvature, while maintaining a bubble of generally constant length, to produce a vial meeting current sensitivity standards.

The incorporation of core elements in level vials has been shown in Smith U.S. Pat. No. 612,557; Bishop U.S. Pat. No. 771,803; Erdmann U.S. Pat. No. 1,654,248; and Balint U.S. Pat. No. 3,583,073. However, the core elements in none of these devices disclosed is employed in either the manner or environment of this invention. Bishop and Erdmann both utilized straight coaxial cores and cylinders to enhance bubble visibility. Smith employed a vertical post to increase the sensitivity of his circular vial, and, as such, his circular vial produces a measuring device of such increased sensitivity that it would wholly fail to achieve the increased range objective of this invention. Balint fashioned a concave core to effect conventional level measurement as an alternative to the barrel-shaped bore utilizing conventional radius of curvature. Balint, however, does not relate to extended pitch range vials or levels; and, to the contrary, the geometry of the Balint vial has been found to be unsatisfactory for extended range vials due to undesirable and excessive bubble elongation as the pitch angle is increased.

It is, therefore, an object of this invention to provide a vial for level instruments of a predetermined pitch sensitivity while simultaneously extending the useable pitch range of the vial to enhance the vials pitch measuring capability and versatility.

It is further desired that such a vial should have a barrel-shaped bore of suitable negative draft to facilitate conventional and inexpensive injection molding manufacturing techniques and that the bubble should remain generally constant in length over the range of pitch measurement. In addition, the vial should contain an inexpensive and easily manufactured core pin wherein the internal vial geometry and coaction of internal vial surfaces with the geometry of external core pin surfaces and the bubble will result in an extended range level vial.

Various other objects and advantages of the invention will hereinafter become more fully apparent from the following description of the embodiments and the drawings wherein.

Figure 1:
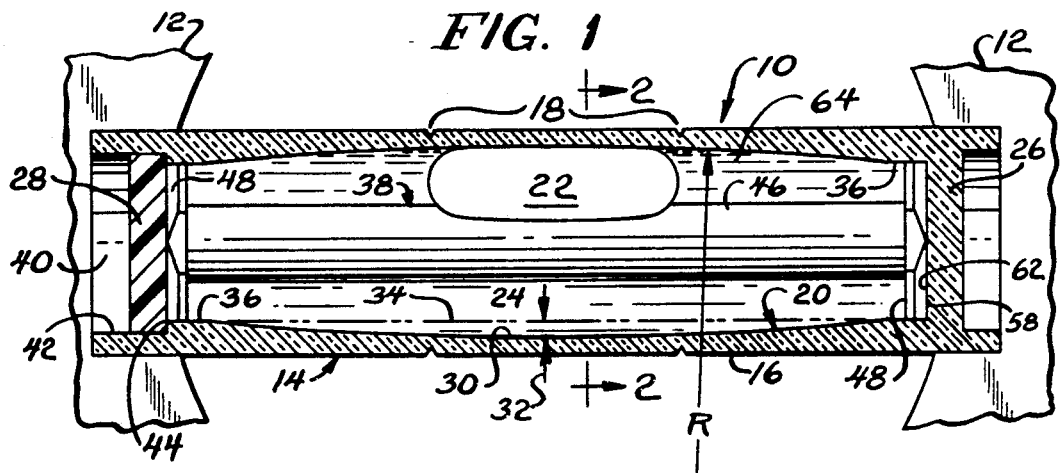
FIG. 1 illustrates a vial made in accordance with this invention and installed on the frame of a level instrument in a section passing through the longitudinal axis of the vial.
Figure 2:
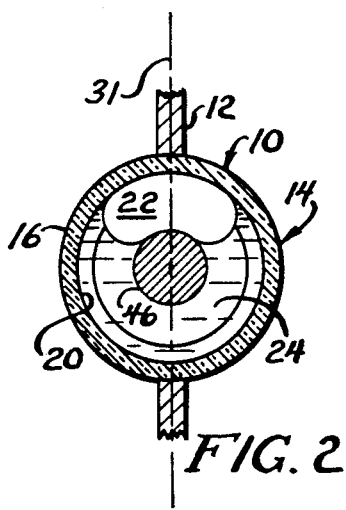
FIG. 2 is a cross section of the vial and frame illustrated in FIG. 1 and taken on lines 2—2 thereof; and, FIG. 3 is a side elevation of a level vial installed in the web portion of a level instrument frame.

FIGS. 1 and 2 illustrate the plastic level vial, generally designated 10, installed in the body or frame portion 12 of a conventional level instrument in a manner such as illustrated in U.S. Pat. No. 3,311,990, to Donald E. Wright, which issued on Apr. 4, 1967.

Vial body 14 is a generally cylindrical member having a straight cylindrical outer surface 16 with two spaced annular grooves 18 painted or cut therein. These grooves define parallel planes disposed perpendicularly to the longitudinal axis of the vial and spaced equidistant from the midpoint of generally barrel-shaped interior surface 20. The spacing of grooves 18 is determined by the size of bubble 22 so that the ends of the bubble generally coincide with grooves 18 to indicate a level condition.

A bubble chamber 24 located inside a vial body 14 is defined by surface 20, integral chamber end 26, and chamber end cap 28. The geometry of surface 20 includes a barrel-shaped cylindrical contour 30 having a generally circular curvature as defined by the intersection of that surface and a plane 31 passing through the longitudinal axis of chamber 24. This curvature has a radius R which, for the vial of this invention, typically exceeds that of conventional vials by two to three times, e.g. 19 inches as compared with 9 inches. Since the maximum length of conventional barrel-shaped bores is limited for a given vial diameter by the maximum negative draft 32 of the barrel at its midpoint (e.g., about 0.007 inches for a ⅜ inch diameter vial), the significantly increased radius of curvature of this invention results in a directly corresponding increase in the length of the barrel-shaped surface 30 as illustrated by the length of cord 34, FIG. 1. As a consequence, the barrel-shaped surface 30 may now, in injection molding processes, be extended substantially to the end limits of bubble chamber 24.

The internal vial surface 20 also contains a pair of straight cylindrical bore-regions 36 immediately adjacent end 26 and cap 28 which function principally to receive and align core member 38 which is inserted into and coaxially retained within the vial bore. Prior to assembly, vial body 14 contains an opening 40 into bubble chamber 24 through bore 42. The diameter of bore 42 is greater than the adjacent bubble chamber straight regions 36 thereby forming an annular ridge 44 against which end cap 28 seats. The diameter of end cap 28 is dimensioned to be snugly, but non-interferingly, received within bore 42.

It has been found advantageous to secure the molding core insert at both ends during fabrication of vial body 14 where it is desired to enhance the axial alignment accuracy of barrel surface 30 within the vial body. Consequently, a second end cap 28 and bore 42 may be provided in lieu of integral end 26 thereby creating a vial with openings 40 at both ends. In this manner both ends of the molding core insert are accessible and may be secured during molding.

Core member 38 comprises a longitudinal core pin 46 with a positioning member 48 at each end thereof. It is preferred to injection mold the entire core member 38 as a single integral piece; although positioning members 48 may be separately fabricated and installed on core pin 46. The core pin may be of uniform cross-section, such as the cylindrical core pin 46 illustrated, or it may be of a generally concave or barrel shaped contour having a radius of curvature (of the surface as defined by the intersection of plane 31 and the pin surface itself) generally exceeding that of the barrel surface, R. Convex core pin contours have been found to provide unacceptable bubble elongation and are not recommended.

The surfaces of the barrel shaped bore 30 and core pin 46 coact to create a vial having a wide range of pitch measuring capability at essentially a standard sensitivity level.

Figure 8:
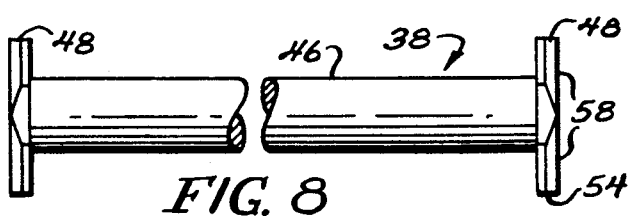
FIG. 8 is a side view of the vial core pin member having positioning and retaining ends thereon.
Figure 9:
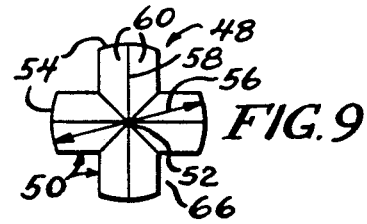
FIG. 9 is an end view of the core pin member further illustrating the positioning and retaining ends.

As best illustrated in FIGS. 8 and 9, positioning members 48 are comprised of four substantially identical arms 50 spaced 'cardinally' around the core pin longitudinal axis 52 thereby forming a generally symmetrical cross-shaped 'star' structure. Outer arm edges 54 define segments of a common cylindrical surface of diameter 56 centered about core pin axis 52. Diameter 56 is substantially the same as, but slightly less than, the diameter of the straight cylindrical bore-regions 36 to facilitate the non-interfering placement and tight retention of position members 48 in respective bore-regions 36.

Each arm 50 contains a outer ridge 58 defined by the intersection of a pair of sloping surfaces 60. The overall length of core member 38 between opposite outer ridges 58 is substantially the same as, but slightly less than, the corresponding distance between inner surfaces of end 26 and cap 28. Again, this assures tight, but non-interfering, retention of core member 38 within bubble chamber 24.

The above described four-arm star positioning member is advantageously designed to facilitate molding and ultimate vial assembly. First, the twin symmetry of this member along the axes defined by the perpendicular ridges 58 facilitates the unrestricted removal of the core member from the molding die during fabrication. A three-arm Y-shaped star, by comparison, while suitable to properly position and retain the core pin within the vial, is more difficult to mold.

Further, the use of arms 50 instead of a solid circular member provides 66 openings therebetween through which a liquid injector nozzle may be passed as required during assembly to properly charge the vial prior to sealing. Additionally, the sloped surfaces 60 guide the injector nozzle toward one of the openings in the event that the nozzle should strike an arm during insertion. Finally, the reduced material utilized by this configuration, as compared with a full circular member, saves material costs and lessens material shrinkage following molding.

In assembly of the level of this invention, core pin member 38 is inserted axially through opening 40 into bubble chamber 24 until ridges 58 of the first positioning member 48 are brought into abutting contact with the inside surface 62 of end 26. This properly positions members 48 within respective cylindrical bore-regions 36 and centers the core pin along the longitudinal axis of the vial body and bubble chamber.

The vial body is next positioned vertically with opening 40 at the top. An injector nozzle is inserted through one of the four openings in positioning members 48 and a predetermined quantity of vial fluid 64, such as mineral spirit, is then introduced into the bubble chamber. End cap 28 is then positioned in bore 42 and urged into contact with annular ridge 44. An essentially permanent and hermetic seal of bubble chamber 24 is produced by sonically welding end cap 28 to the vial body.

Vial body 14 is preferably manufactured utilizing high volume injection molding techniques from a plastic molding material having a high degree of transparency, dimensional stability and workability. Although a wide variety of plastic materials are available as potential vial stock, acrylic thermoplastic polymers such as methyl methacrylate (commonly known lucite) are presently preferred because of their degree of transparency; their dimensional stability under broadly varying conditions; and their workability under the stress of high speed production techniques.

As discussed above, core member 38 is injection molded preferably as a single piece including positioning members 48 and core pin 46. Preferably, core member 38 is fabricated from the same acrylic thermoplastic material comprising the vial body.

Figure 3:
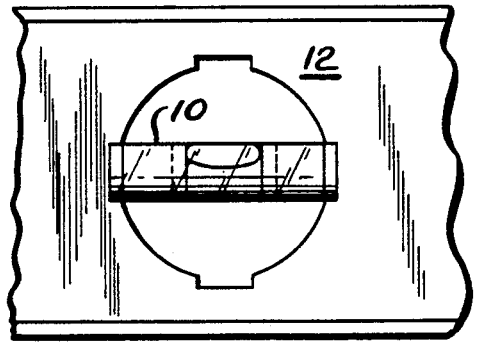

When the level vial of this invention is maintained in a "level" condition, bubble 22 seeks, in the conventional manner, the highest point in the vial which corresponds to the maximum diameter of the barrel-shaped bore at the vial midpoint. This condition is illustrated in FIGS. 1 and 3. Opposing bubble 22 ends are aligned substantially adjacent annular grooves 18 while the bubble remains in contact with core pin 46. It can be appreciated that the axially symmetric vial of this invention functions equally in any orientation about the longitudinal axis and, therefore, neither special alignment of the vial during installation into the level or particular "upright" positioning of level instrument during use is required.

Figure 4:
FIG. 4 illustrates a conventional prior art vial with bubble therein positioned at a pitch angle of ⅛ inch rise per foot.
Figure 5:
FIG. 5 illustrates the level vial of this invention with bubble therein positioned at a pitch angle of ⅛ inch per foot.

As the level instrument is displaced from the "level" position, bubble 22 travels longitudinally through the vial maintaining contact with core pin 46 and barrel-shaped surface 30. For vials of standard sensitivity, bubble 22 is displaced longitudinally approximately 1/10 inch for each pitch increase of ⅛ inch per foot. FIGS. 4 and 5 illustrate, respectively, bubble positions for a conventional vial and the vial of this invention at a pitch of ⅛ inch per foot.

A vial of otherwise conventional design but having a substantially increased radius of curvature of surface 30, exhibits excessive and unacceptable sensitivity wherein the bubble moves substantially further, for a given pitch change, than mandated by the federal standard. But more importantly, the overall pitch measuring range of such a "modified" vial would actually decrease over that of the conventional vial of conventional dimensions. This is due to the fact that, although the barrel length of the "modified" vial is significantly increased, the enhanced level sensitivity causes the bubble to travel the greater distance to the barrel end limits for a lesser overall angular or pitch displacement of the level. Thus, increasing the radius of curvature, alone, operates to unacceptably increase vial sensitivity while failing to increase the pitch range.

Figure 6:
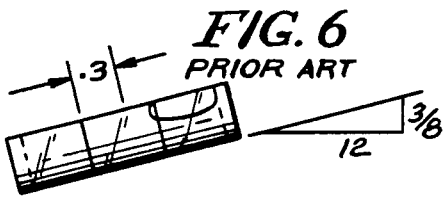
FIG. 6 illustrates a conventional prior art vial with bubble therein positioned at a pitch angle of ⅜ inches per foot rise.
Figure 7:
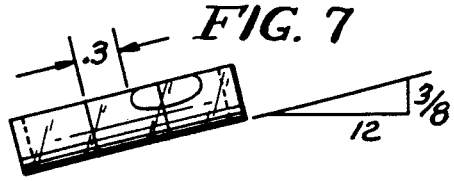
FIG. 7 illustrates the level vial of this invention with bubble therein positioned at a pitch angle of ⅜ inches per foot.

The vial of this invention, however, incorporates a core pin which functions to maintain standard vial sensitivity, as shown in FIGS. 5 and 6, in a vial having a substantially lengthened barrel-shaped surface. Since the rate of bubble movement remains unchanged, greater angular displacement of the level instrument is required to force the bubble to the more distant limits of the barrel. This results in a substantial increase in the overall pitch measuring range of the vial of this invention.

Core pin 46 "slows down" or retards the otherwise unrestricted movement of bubble 22 by effectively and increasingly "sandwiching" the bubble between the barrel surface 30 and the core pin 46. This retardation of movement, as compared to a pinless vial, is believed due to modified surface friction resulting from changing bubble geometries as the bubble 'propagates' through the vial. Generally, the larger the diameter of the core pin, the greater the retardation of the bubble movement and corresponding reduction in pitch sensitivity.

The extended pitch measuring range of this invention is illustrated in FIGS. 4 through 7. FIGS. 4 and 5 compare, respectively, the convention vial to the vial of this invention. In each case, the bubble is shown displaced the 'standard' 1/10 inch for a pitch of ⅛ inch per foot. As the pitch angle is increased, for example, to ⅜ inch per foot, however, the bubble in the conventional vial, FIG. 6, "slips-out" of the barrel region quickly reaching the upper end of the vial. In this condition, the level instrument is unable to provide meaningful pitch information. It merely indicates that the surface being measured is not level without providing any indication as to the degree or closeness of that surface to the level condition. By contrast, the bubble in the vial of this invention, FIG. 7, continues to advance laterally at the 'standard' rate (1/10 inch for each pitch increase of ⅛ inch per foot) along the lengthened barrel region thereby rendering accurate and meaningful near-level pitch information.

A significant feature of this invention is that the longitudinal length of bubble 22 remains nearly constant as the bubble travels the total length of bubble chamber 24. This is due to the relatively large radius of curvature of barrel-shaped surface 30 which causes only a slight reduction in the cross-sectional area of the bubble chamber at its ends.

Various modes of carrying out the invention are contemplated as being within the scope of the following claims which particularly point out and distinctly claim the subject matter regarded as the invention.

I claim:

1. A level vial comprising a body having a bore formed with a barrel shaped portion having opposed ends and wherein the barrel curvature is defined by a first radius of curvature, the barrel shaped portion of the bore having a cross-sectional dimension generally decreasing from the center thereof in axially opposed directions towards the ends thereof, an axially elongated core member disposed within the bore and between the opposed ends thereof in coaxial relationship with the barrel shaped portion of the body and having a maximum cross-sectional dimension and having a second radius of curvature exceeding that of the first radius of curvature of the barrel shaped bore portion, a quantity of fluid disposed within the bore and being insufficient to fill the bore and to provide a bubble therein having a dimension sufficient to simultaneously contact the surfaces of the barrel shaped bore portion and the core member, means for hermetically sealing the bore to contain the fluid and to maintain the bubble therein, the vial body having a transparent portion and indicator means associated therewith to permit visual bubble observation and for indicating preselected positions of the bubble in the vial and wherein the surfaces of the barrel shaped bore portion and the core member coact with the bubble to produce gradual bubble movement axially within the barrel shaped bore portion without abrupt bubble acceleration and while providing a wide range of visually observable angular measures.

2. The level vial of claim 1 wherein the first radius of curvature is selected to produce a barrel-shaped region of predetermined length for a selected barrel negative draft, said barrel length defining the pitch measuring range to the level vial, and wherein the second radius of curvature and maximum cross-sectional dimension of the core member are selected to coact with the barrel-shaped region to produce a predetermined vial sensitivity.

3. the vial of claim 1 wherein the first radius of curvature is selected to produce a longer than standard barrel region, the length of said barrel region defining the pitch measuring range of the level vial, and wherein the core member is selected to produce a standard vial sensitivity whereby the overall vial exhibits expanded pitch measuring range while maintaining standard sensitivity.

4. A level vial of predetermined sensitivity and pitch range comprising:

(a) a body having a bore with a barrel shaped region formed therein having opposed ends, the barrel shaped portion of the bore having a cross-section dimension decreasing from the center thereof in axially opposed directions towards the ends thereof, the barrel region being defined by a negative draft, a first radius of curvature, and an axial length, said predetermined pitch range directly corresponding to the axial barrel length, wherein the axial barrel length further corresponds to the first radius of curvature for a selected negative draft;

(b) an axially elongated core member disposed coaxially within the vial bore, the core member being defined by a second radius of curvature exceeding that of the first radius of curvature and a maximum diameter, said predetermined vial sensitivity corresponding to the second radius of curvature and core member diameter;

(c) a quantity of fluid disposed within the bore and being insufficient to fill the bore thereby providing a bubble therein having a dimension sufficient to simultaneously contact the surfaces of the barrel shaped bore portion and the core member;

wherein the surfaces of the barrel shaped bore portion and the core member coact with the bubble to produce axial movement of the bubble within the barrel portion at the predetermined sensitivity.

5. In a level vial having a body, a bore therein having a barrel shaped region and opposed ends; the barrel region having a first radius of curvature, a quantity of fluid disposed within the bore insufficient to fill the bore thereby creating a bubble, means for decreasing the sensitivity of the level vial.

6. In a level vial of claim 5, said means for decreasing the sensitivity of the level vial comprise an axially elongated core member disposed coaxially within the bore; the core member having a second radius of curvature exceeding the first radius of curvature of the barrel region wherein the barrel region and core member coact with the bubble to retard axial movement of the bubble.

7. In a level vial of claim 6, the second radius of curvature of the core member being essentially infinite thereby providing an elongated core member of uniform cross-section.

8. In a level vial of predetermined sensitivity having a body with a barrel-shaped bore portion therein; the barrel-shaped region having a maximum allowable negative draft as a function of vial diameter and a corresponding length defined by the negative draft and the predetermined sensitivity; the improvement comprising a barrel region of increased length having a negative draft not exceeding the maximum allowable draft; an axially elongated core member disposed coaxially within the barrel-shaped region, the core member coacting with the barrel region to produce gradual bubble movement thereby resulting in a vial of said predetermined sensitivity having increase pitch measuring capability.

9. In a level vial comprising a body having a bore with opposed ends, the bore having first and second cylindrical portions adjacent the opposed ends, and an axially elongated core member extending coaxially substantially from the first cylindrical portion to the second cylindrical portion; means for positioning and retaining the elongated core member coaxially within the bore between said opposed ends.

10. In a level vial of claim 9, said positioning and retaining means include means disposed between opposing ends of the elongated core member and respective cylindrical bore portions for engaging said ends and for contacting said cylindrical bore region surfaces.

11. In a level vial of claim 9 said positioning and retaining means include means integral to said elongated core member disposed between opposing core member ends and respective cylindrical bore portions for contacting the cylindrical bore region surfaces.

12. In a level vial of claim 10 said positioning and retaining means comprises star members on opposed ends of the core member, each star member having at least two arms extending generally outwardly and perpendicularly from the axis of the core member a distance substantially equal to the radius of the cylindrical bore regions, wherein the star arms contact the cylindrical regions and position and retain the elongated core member in coaxial alignment.

13. In a level vial of claim 12, the star arms include surfaces disposed axially toward the bore ends, said surfaces being arranged in a generally sloping non-perpendicular relationship with respect to the axis wherein said sloping surfaces function during vial assembly to divert fluid injectors from the arms into open regions defined between adjacent arms.

* * * * *